(12) United States Patent
Karaoguz et al.

(10) Patent No.: US 8,908,759 B2
(45) Date of Patent: Dec. 9, 2014

(54) NETWORK PACKET AWARE DATA ENCODING

(71) Applicant: Broadcom Corporation, Irvine, CA (US)

(72) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 2 days.

(21) Appl. No.: 13/917,182

(22) Filed: Jun. 13, 2013

(65) Prior Publication Data

US 2013/0279604 A1   Oct. 24, 2013

Related U.S. Application Data

(63) Continuation of application No. 13/619,456, filed on Sep. 14, 2012, now Pat. No. 8,477,839, which is a continuation of application No. 12/367,023, filed on Feb. 6, 2009, now Pat. No. 8,311,092.

(51) Int. Cl.
| | |
|---|---|
| H04N 7/26 | (2006.01) |
| H04N 19/85 | (2014.01) |
| H04N 21/2381 | (2011.01) |
| H04N 21/643 | (2011.01) |
| H04N 19/164 | (2014.01) |
| H04N 19/61 | (2014.01) |
| H04N 19/115 | (2014.01) |
| H04N 19/177 | (2014.01) |

(52) U.S. Cl.
CPC ..... *H04N 19/00903* (2013.01); *H04N 21/2381* (2013.01); *H04N 21/64322* (2013.01); *H04N 19/00236* (2013.01); *H04N 19/00781* (2013.01); *H04N 19/0006* (2013.01); *H04N 19/00284* (2013.01)
USPC ...................................... 375/240.01; 386/329

(58) Field of Classification Search
CPC ........ H04N 7/26; H04N 7/50; H04N 7/26941
USPC ...................................... 375/240.01; 386/329
See application file for complete search history.

(56) References Cited

U.S. PATENT DOCUMENTS

| | | | |
|---|---|---|---|
| 6,547,279 B1 * | 4/2003 | Amamori | 280/743.1 |
| 7,093,028 B1 | 8/2006 | Shao et al. | 709/240 |

(Continued)

OTHER PUBLICATIONS

Sharman et al., "Cache Architecture for On-Demand Streaming on the Web", Sep. 19, 2007, ACM Transactions on the Web, vol. 1, No. 3, Article 13, pp. 1-35.*

(Continued)

*Primary Examiner* — Matthew Smithers
(74) *Attorney, Agent, or Firm* — Brinks Gilson & Lione

(57) ABSTRACT

A communication device is operable to manage communication of data streams, which comprise data encoded utilizing scheme that generate plurality of frames with logical grouping and/or inter-frame dependencies, based on determination of network payload parameters that are utilized for the data transmission. Exemplary encoding schemes comprise MPEG encoding, which generates data streams comprised I-frames, P-frames and/or B-frames. Network packets that are utilized to perform data communication are generated such that packet payloads comprise only data corresponding to a single frame and/or logical grouping within the encoded data stream. Feedback from networking subsystem in the communication device may be provided during processing of the data streams to enable use of network payload parameters during encoding operations. Frame sizes may be adjusted, for example, so that a size of each frame is multiple of a size of a payload of the network packets that are utilized in data communication.

20 Claims, 6 Drawing Sheets

(56) References Cited

U.S. PATENT DOCUMENTS

| | | | |
|---|---|---|---|
| 2003/0152148 A1* | 8/2003 | Laksono | 375/240.24 |
| 2004/0202248 A1* | 10/2004 | Boroczky et al. | 375/240.12 |
| 2004/0261135 A1* | 12/2004 | Cahnbley et al. | 725/146 |
| 2007/0053444 A1 | 3/2007 | Shibata et al. | 375/240.26 |
| 2010/0202508 A1 | 8/2010 | Karaoguz et al. | 375/240.01 |
| 2011/0103766 A1* | 5/2011 | Priddle et al. | 386/241 |

OTHER PUBLICATIONS

Paakkonen et al., "An Optimized Message-Oriented Middleware Solution for Extending Enterprise Services to the Mobile Domain", 2005, IEEE Computer Society, pp. 1-7.

Challenger et al., "A Scalable and Highly Available System for Serving Dynamic Data at Frequently Accessed Web Sites", 1998, IEEE, pp. 1-30.

\* cited by examiner

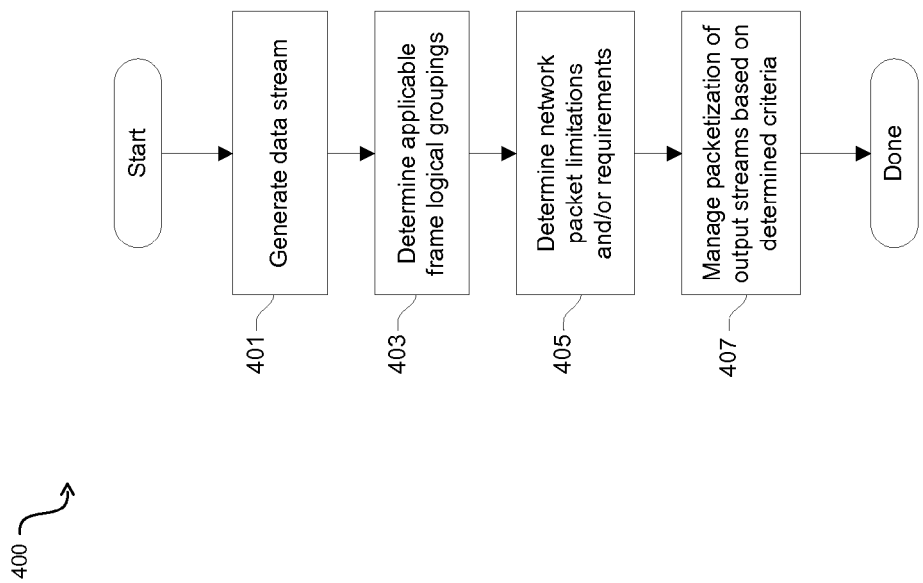

NETWORK PACKET AWARE DATA ENCODING

CROSS REFERENCE TO RELATED APPLICATIONS

This application is a continuation of U.S. application Ser. No. 13/619,456 filed Sep. 14, 2012, issued as U.S. Pat. No. 8,477,839 on Jul. 2, 2013, which is a continuation of U.S. application Ser. No. 12/367,023, filed Feb. 6, 2009, is as U.S. Pat. No. 8,311,092 on Nov. 13, 2012, which are incorporated herein in their entirety by this reference.

TECHNICAL FIELD

Certain embodiments of the invention relate to communication. More specifically, certain embodiments of the invention relate to a method and system for network packet aware data encoding.

BACKGROUND

The growth of system connectivity has been one of the major developments in recent years. Fewer and fewer systems are operating as stand-alone system, and most of today's systems are increasingly becoming elements of one or more larger or complex networks. This growth in various networking technologies have provided improved performance and increased flexibility for these networks. Various wired and/or wireless based communication standards have been developed to satisfy demands for ever expanding system connectivity. The growth of system connectivity has also spurred a growth in applications that takes advantage of the benefits offered by the improved system connectivity, especially those having access to entities that provides improved processing and/or storage capabilities.

Communication end-point devices, which are mobile and/or stationary, comprise a plurality of wired and/or wireless technologies to enable use of various interfaces for transmitting and/or receiving data. For example, mobile devices, which enable cellular connectivity, have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, CDMA2000, and LTE, incorporate substantial data capabilities. Most of today's mobile services comprise such features as text messaging, audio/video streaming, and web browsing. Modern mobile devices, for example cell phones and/or smart phones, are utilized to support additional services via other wireless interfaces, for example, wireless personal area networks (WPAN) and/or wireless local area network (WLAN) interfaces.

The use of wireless personal area networks (WPAN) continues to gain popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). An exemplary WPAN system utilizes a standardized technology such as Class 2 Bluetooth (BT) technology. While WPAN may be very beneficial for certain applications, other applications may require larger service areas and/or capabilities. To satisfy such needs, other technologies such as Wireless local area networks (WLAN) have been developed to provide greater wireless service. In contrast to the WPAN systems, WLAN provide connectivity to devices that are located within a slightly larger geographical area, such as the area covered by a building or a campus, for example.

WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system. Some WLAN systems are operated in conjunction with WPAN systems to provide users with an enhanced overall functionality. For example, Bluetooth technology may be utilized to connect a laptop computer or a handheld wireless terminal to a peripheral device, such as a keyboard, mouse, headphone and/or printer, while the laptop computer or the handheld wireless terminal is also connected to a campus-wide WLAN network through an access point (AP) located within the building. Also, mobile technology enables the use of the mobile phone as a form of wireless modem that allows connecting a laptop, for example, to the internet via a mobile network. More recently, Worldwide Interoperability for Microwave Access (WiMAX) based systems have become popular, and use of WiMAX to provide wireless connectivity is expanding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A system and/or method is provided for network packet aware data encoding, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

The innovation may be better understood with reference to the following drawings and description. In the figures, like reference numerals designate corresponding parts throughout the different views.

FIG. 4 is a flow chart that illustrates use of network packet awareness during media transport, in accordance with an embodiment of the invention.

DETAILED DESCRIPTION

Certain embodiments of the invention may be found in a method and system for network packet aware data encoding. In various embodiments of the invention, a communication device is operable to manage communication of data streams to, for example, improve reliability and robustness of the communication. Data that is communicated via the data streams is encoded utilizing encoding scheme that generates plurality of frames with logical grouping and/or inter-frame dependencies. Exemplary encoding schemes comprise MPEG encoding, wherein generated data streams comprise I-frames, P-frames and/or B-frames. The communication device is operable to determine network payload parameters that are utilized for communicating the data streams via one or more network interfaces utilized by the communication device. The communication device is operable to rearrange at least a portion of the encoded data based on the network parameters and communicate the encoded data, utilizing the data streams. Network packets that are utilized to perform data communication are generated such that packet payloads comprise only data corresponding to a single frame and/or logical grouping within the encoded data stream. In instances where a networking subsystem is utilized in the communication device to perform data communication via network interfaces, the network subsystem is enabled, for example, to examine appropriate headers to determine type of data communicated and/or framing parameters. Feedback from the networking subsystem in the communication device may also be provided during processing of the data streams to enable use of network payload parameters during encoding operations. The feedback is utilized, for example, by a processing subsystem in the communication, which is operable to perform encoding related operations, during data encoding. The feedback may be provided dynamically during data communication operations and may be utilized to adjust encoding parameters to ensure, for example, that frame sizes are adjusted so that size of each frame is multiple of size of payload of network packets that are utilized in data communication.

Figure 1:
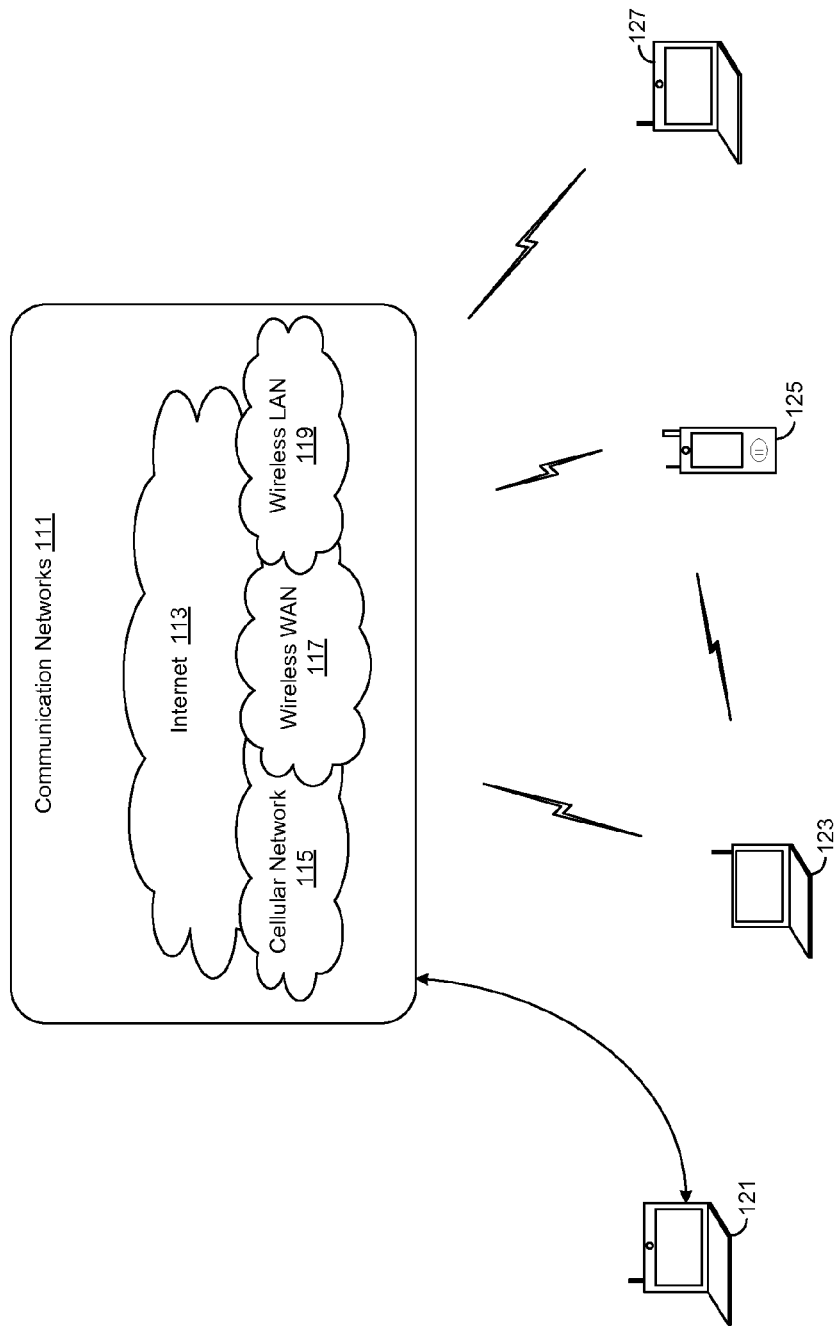
FIG. 1 is a block diagram that illustrates an exemplary communication system that enables network packet awareness during media streams transport, in accordance with an embodiment of the invention.

FIG. 1 is a block diagram that illustrates an exemplary communication system that enables network packet awareness during media streams transport, in accordance with an embodiment of the invention. Referring to FIG. 1, there is shown a plurality of communication networks 111, Internet 113, a cellular network 115, a wireless wide area network (WWAN) 117, a wireless local area network (WLAN) 119, and end-point devices 121, 123, 125 and 127.

The plurality of communication networks 111 comprises one or more networks that are operable to enable wireless and/or wired communication among a plurality of local and/or remote entities. The network connectivity available via the plurality of communication networks 111 is based on one or more communication standards and/or protocols. The plurality of communication networks 111 comprises, for example, the Internet 113, the cellular network 115, the WWAN 117 and/or the WLAN 119.

The Internet 113 comprises a system of interconnected networks to enable exchange of data between a plurality of nodes, based on one or more networking standards, including, for example, the Internet protocol (IP). The physical connectivity is provided in the Internet 113, for example, via the Public Switched Telephone Network (PSTN), via copper wires, fiber-optic cables, wireless interface and/or other standards-based interfaces. The transport function is performed in the Internet 113, for example, based on one or more protocols, including, for example, the TCP/IP protocol.

The cellular network 115 is operable to enable communication and/or connectivity via one or more cellular technologies. Exemplary cellular technologies comprise CDMA, WCDMA, CDMA1000, HSDPA, GSM, GPRS, EDGE and/or UMTS. The WWAN 117 is operable to enable communication and/or connectivity via one or more wireless wide network area standards and/or protocols. Exemplary wireless wide network area technologies comprise, for example, WiMAX based networks. The WLAN 119 is operable to enable communication and/or connectivity via one or more wireless local network area standards and/or protocols. Exemplary wireless local network area technologies comprise, for example, IEEE 802.11 based interfaces.

Each of the end-point devices 121, 123, 125 and 127 is operable to perform one or more tasks and/or applications requested via a user of the end-point devices. The end-point devices 121, 123, 125 and 127 are operable to enable network connectivity, via one or more of the communication networks 111, through one or more wireless and/or wired interfaces. For example, the end-point devices 121, 123, 125 and/or 127 may be operable to utilize wired or wireless links to establish network connectivity via the Internet 113, cellular network 115, the WWAN 117 and/or the WLAN 119, respectively, to form communication pathways that support one or more applications originating and/or terminating in the devices. Exemplary wired and wireless links comprise Ethernet links, fiber optical links, cellular links, WiMAX links and/or 802.11 links. Exemplary devices comprise a PDA, a Smartphone, a laptop and/or a PC that are operable to enable utilizing one or more wired and/or wireless communication interfaces. The end-point devices 121, 123, 125 and 127 are also operable to communicate directly via appropriate wireless and/or wired interfaces.

In operation, the end-point devices 121, 123, 125 and/or 127 are operable to perform a plurality of tasks requested via users of the devices. In instances where the requested services require network access, the end-point devices are operable to obtain network connectivity directly via the communication networks 111 and/or indirectly via one or more of the end-point devices when these devices are communicatively coupled. In an exemplary aspect of the invention, the end-point devices 121, 123, 125 and/or 127 are operable to generate and/or communicate data streams comprise voice and/or multimedia information. Multimedia information may comprise video, data, text, and/or images. The data streams may comprise, for example, media streams that are encoded based on one or more applicable encoding scheme. The encoding of the data streams may provide encryption and/or compression to enable secure and efficient transport of the data streams.

In an exemplary aspect of the invention, a plurality of frames is generated during encoding of data streams. The framing of data streams enable utilizing logical grouping to further improve security and/or efficiency of data transmission and/or transport. Framing logical grouping may comprise inter-frame dependencies wherein at least some frames reference other frames to enable reusing information that are already communicated via the referenced frames. For example, MPEG encoding may be utilized with audio/video data wherein the data is processed to generate frame stream comprising a plurality of I-frames, P-frames and B-frames.

The frame streams are logically grouped, wherein each logical grouping may comprise an I-frame and its dependent P-frames and/or B-frames. The receiving device is operable to extract the intended data carried in the referencing frames by processing the received referencing frame and reusing information extracted from referenced frames.

During data communication between the devices, network packets may be utilized to carry the data streams. The network packets utilized during data communication may be subject to payload limitations. The size of data carried in the network packets may be limited, for example, by network interface standards and/or by operational limitations, for example, device limitations, user preferences, quality of service (QoS) and/or bandwidth limitations in networks utilized during the communication. Because of logical grouping and/or interframe dependencies that may exist in encoded data stream, network packets may comprise data corresponding to frames of different types and/or grouping. Therefore, the quality of received data streams, in the event that such network packets are lost, may be substantially degraded because the network packet loss would impact more than one frame. The quality of the received data streams is especially affected where at least some of frames are referenced frames. In an exemplary aspect of the invention, processing of data stream communicated between devices via network connection is performed based on characteristics of network communication ultimately utilized to transmit the data streams. Generation of data packets and/or encoding of the data streams is performed, for example, in a manner that prevents packing data corresponding to more than one frame and/or logical grouping within network packets.

Figure 2A:
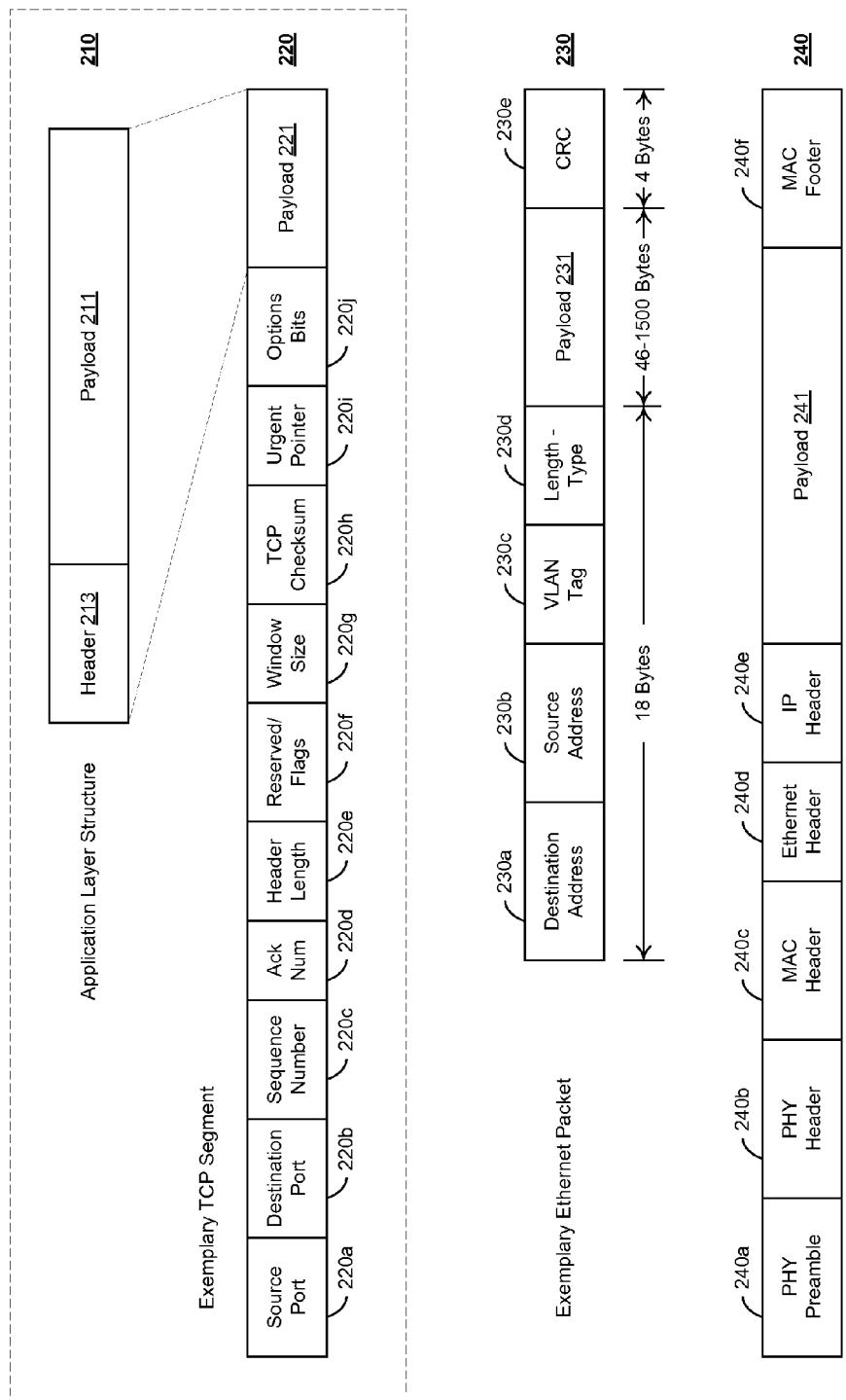
FIG. 2A is a block diagram that illustrates exemplary structures utilized in generating and communicating network packets when transporting data streams.

FIG. 2A is a block diagram that illustrates exemplary structures utilized in generating and communicating network packets when transporting data streams, in accordance with an embodiment of the invention. Referring to FIG. 2A, there is shown an exemplary application layer structure 210, an exemplary TCP segment 220, an exemplary Ethernet packet 230, and an exemplary 802.11 packet 240.

The application layer structure 210 is utilized to communicate data and/or messaging between two instances of the same application, running in different devices and/or systems. Exemplary applications are HyperText Transfer Protocol (HTTP), File Transfer Protocol (FTP), telecommunication network (Telnet) protocol. The application layer structure 210 comprises, for example, a payload 211 and an application header 213. The payload 211 corresponds to communicated data and/or messaging. The payload 211 comprises, for example, data bits, padding bits and/or any headers and/or footers. The application header 213 is generated and/or set to enable processing the application layer structure 210 on the receiving, for example to enable extracting and/or digesting the payload 211. The size of the payload 211 may be variable, and it may depend on a size of data available for transfer and/or by physical and/or logical size limitations imposed by the application and/or other protocols used during the data communication.

The TCP segment 220 is utilized to enable transporting instances of the application layer structure 210 between sending and receiving entities. The TCP transport protocol enables reliable and synchronized segmented delivery of data streams between sending and receiving entities. The TCP segment 220 is structured, for example, based on the TCP/IP (IPv4) model. The TCP segment 220 may comprise a source port field 220a, a destination port field 220b, a sequence number field 220c, an acknowledgement (ACK) number field 220d, a header length field 220e, a reserved/flags field 220f, a window size field 220g, a TCP checksum field 220h, an urgent pointer field 220i, an options bits field 220j, and a payload 221. The source port field 220a identifies the port from which the TCP segments are sent, and the destination port field 220b identifies the port for which the segments are destined. The sequence number field 220c uniquely identifies each instances of the TCP segment 220. Sequence numbers are used to enable synchronized delivery of the segment. The ACK number field 220d enables the receiving entity to determine the next expected segment. The header length field 220e specifies the size of the header portion of the TCP segment 220. The reserved/flags field 220f comprises a number of reserved bits (for future use) and a number of flag bits that are set to indicate specific information about the current instance of the TCP segment 220 and/or the TCP communication. The window size field 220g specifies the receiving window to enable the receiving entity to determine the amount of data that need be read for a current instance of the TCP segment 220. The TCP checksum field 220h is utilized to enable performing error detection and/or correction, based on the checksum function, during TCP communication. The urgent pointer field 220i and/or the options bits field 220j are utilized to provide specific information relevant to processing data communicate via the TCP segment 220. The payload 221 comprises the data that are communicated via the TCP segment 220. The size of the payload 221 is variable, and may depend on predefined limitations in the TCP protocol, and by physical and/or logical size limitations mandated by other protocols used during the data communication.

The exemplary Ethernet packet 230 represent structure of packets communicated via Ethernet links. The Ethernet packet 230 comprises, for example, a destination address field 230a, a source address field 230b, a virtual local area network (VLAN) tag field 230c, a length/type field 230d, a cyclic redundancy check (CRC) field 230e, and a payload 231. The destination address field 230a identifies the address, generally MAC address, for which the Ethernet packet is destined, and the source address field 230b identifies the address, generally MAC address, from which the Ethernet packet was sent. The VLAN tag 230c is utilized to enable virtual LAN routing, where applicable. The length/type field 230d specifies the length of the payload 231. The destination address field 230a, the source address field 230b, the VLAN tag field 230c and the length/type field 230d are of specific and/or fixed length, and generally span 18 bytes. The payload 231 comprises the data carried via the Ethernet packet 230. The payload 231 comprises actual data, and encapsulation headers and/or footers for applicable layers. The size of payload 231 is variable, and is between 46-1500 bytes. The CRC field 230e is set to enable performing error detection and/or correction, based on the CRC function, during Ethernet based communication.

The 802.11 packet 240 comprises, for example, a physical layer (PHY) preamble 240a, a PHY header 240b, a media access control (MAC) header 240c, a MAC footer 240f, an Ethernet header 240d, an Internet Protocol (IP) header 240e, and a payload 241. The 802.11 packet 240 overall size is set, for example, by protocol specifications. Consequently, the amount of data that is carried via 802.11 packets is limited by the maximum size of the packet and the size of headers that are utilized to enable 802.11 communication between the devices and/or any other headers that are necessary to facilitate transport of network traffic. The PHY preamble 240a comprises a plurality of bytes and/or bits that are utilized to enables receiving devices, for example, to synchronize to the incoming 802.11 signals.

The PHY header 240b comprises a plurality of bytes and/or bits that are utilized to enable receiving device to perform necessary PHY layer processing operations based on the 802.11 protocol. The PHY header 240b comprises, for example, information pertaining to the frame carried via the 802.11, including, for example, size information and/or service related information. Each of the MAC header 240c and the MAC footer 240e comprises a plurality of bytes and/or bits that are utilized to enable receiving devices to perform necessary MAC layer processing operations. The MAC header 240c comprises, for example, addressing information, QoS related information and/or size information. The MAC footer 240f comprises information that enables, for example, error detection and/or correction operations. The various MAC and/or PHY fields enable encapsulating network packets that are then communicated via 802.11 links. The Ethernet header 240d comprises information that enable, for example, identifying the network frame 311 carried via the 802.11 packet 240. Exemplary network frames comprise, for example, IP frames. In instances where the network frame 311 comprises an IP frame, it comprises, for example, the IP header 240e and the payload 241. The IP header 240e comprises a plurality of bit and/or bytes that enable encapsulating the payload 241 in a, for example, IPv4 datagram. The payload 241 comprises data bits, padding bits and/or any additional headers and/or footers. For example, where network traffic is communicated via TCP frames, the payload 241 comprises, in addition to data, TCP headers.

In operation, the application layer structure 210, the TCP segment 220, the Ethernet packet 230 and/or the 802.11 packet 240 enable communication of data streams generated in an end-point device. For example, the end-point devices 121, 123, 125 and/or 127 may be operable to utilize a multilayer encapsulation based model, for example the TCP/IP model, during communication. Accordingly, the data streams communicated between the devices are encapsulated during the communication. For example, where the devices are exchanges media streams, the data is segmented and packed into a plurality of instances of the application layer structure 210, wherein the data is populated into the payload 210. The header 213 is then generated and/or set to enable processing of the application layer structure 210 by corresponding application layer functions in the receiving devices, to extract the data from the payload 211. Each instance of the application layer structure 210 is then encapsulated within TCP segments 220. The application layer structure 210 is stored into payload 221. The remaining fields in the TCP segment 220, comprising the source port field 220a, the destination port field 220b, the sequence number field 220c, the ACK number field 220d, the header length field 220e, the reserved/flags field 220f, the window size field 220g, the TCP checksum field 220h, the urgent pointer field 220i and/or the options bits field 220j, are then updated and/or set to enable processing of the TCP segment 220 by corresponding TCP function in the receiving device, to extract the application layer structure 210 from the payload 221.

The TCP segment 220 is encapsulated into an appropriate link layer packet. This is determined by the communication interface utilized during the communication. For example, where 802.11 link is utilized, between the end-point devices 125 and 123 for example, instances of the 802.11 packet 240 are utilized to transmit TCP segments 220. Accordingly, instances of the TCP segment 220 are encapsulated within the payload 241 of the 802.11 packet 240. The remaining fields in the 802.11 packet 240, comprising the physical layer (PHY) preamble 240a, the PHY header 240b, the media access control (MAC) header 240c, the Ethernet header 240d, the IP header 240e and/or the MAC footer 240f, are updated and/or set to enable performing physical layer (PHY) operations between the communicating devices and/or to enable processing of the 802.11 packet 240 by corresponding link layer function in the receiving device, to extract the TCP segment 220 from the payload 241.

Ethernet packets may be utilized where wired connections are utilized, for example via the Internet 113, to communicate the data streams between the devices. Accordingly, the TCP segment 220 is encapsulated into the payload 231 of the Ethernet packet 230. The remaining fields in the Ethernet packet 230, comprising the destination address field 230a, the source address field 230b, the VLAN tag field 230c, the length/type field 230d and/or the CRC field 230e, are then updated and/or set to enable performing physical layer (PHY) operations between the communicating devices and/or to enable processing of the Ethernet packet 230 by corresponding link layer function in the receiving device, to extract the TCP segment 220 from the payload 231.

In an exemplary aspect of the invention, payload limitations in one or more of the layer packet structure may determine the size of actual data communicated within each networking packet. For example, where 802.11 packet 240 is utilized, the payload 241 is capped at a fixed value, for example 2304 bytes. Additionally, the actual size of the payload 241 may be set to less than the maximum allowed size, due to operational and/or configuration considerations. Since the TCP segment 220 is encapsulated into the payload 241, the payload 221 of the TCP segment 220 is thus dictated by the size of the payload 241, minus size of headers and fields that are used and/or set in the TCP segment 220. The size of the payload 211 is then limited by the size limitation of the payload 221, minus the size of the header 213. Consequently, networking payload limitations and/or considerations are relevant to the size of data and/or messaging that is transmitted within each network packet during data stream communication between the end-point devices.

Figure 2B:
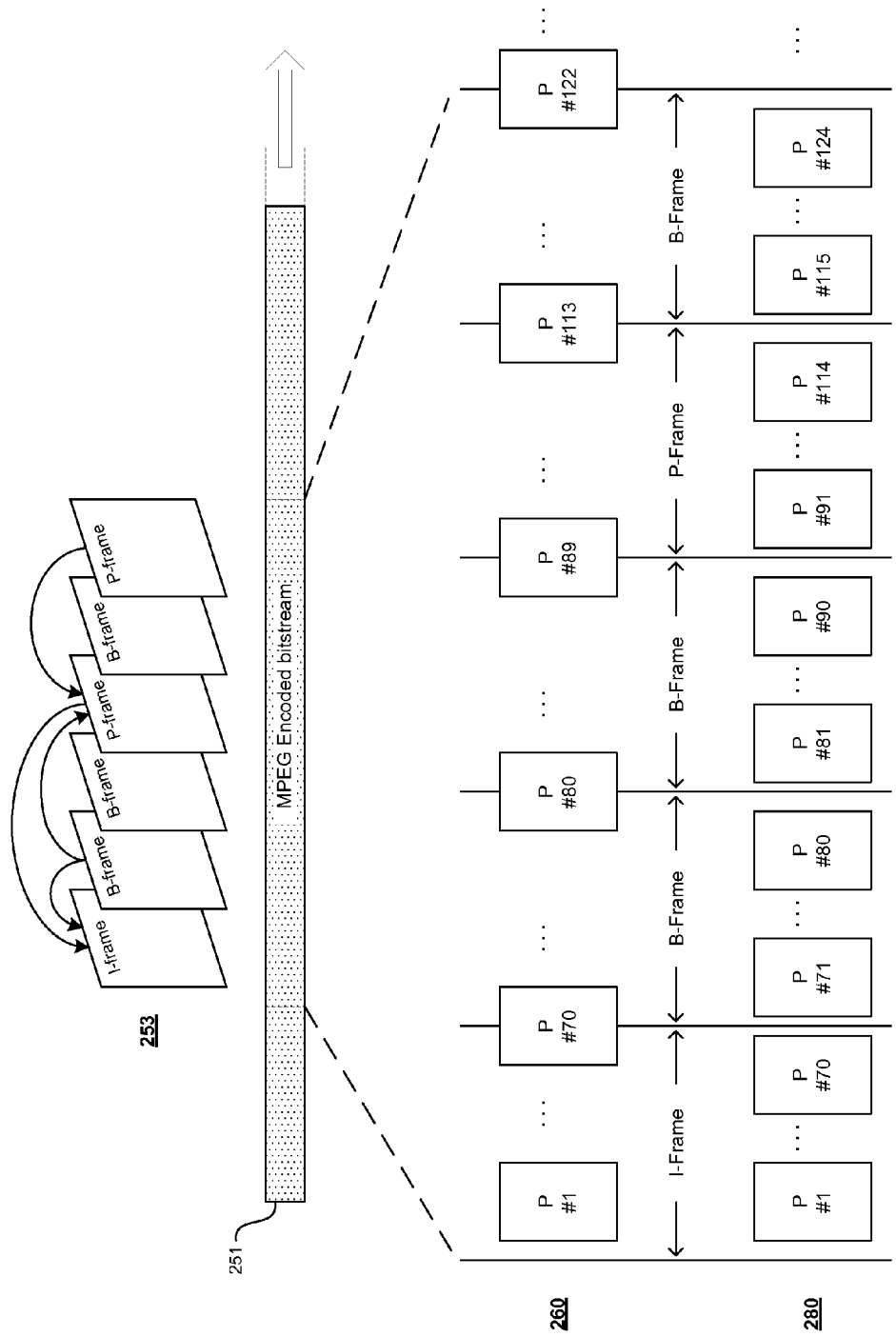
FIG. 2B is a block diagram that illustrates use of network packet awareness during MPEG stream transport, in accordance with an embodiment of the invention.

FIG. 2B is a block diagram that illustrates use of network packet awareness during MPEG stream transport, in accordance with an embodiment of the invention. Referring to FIG. 2B, there is shown an MPEG encoded bitstream 251. The MPEG encoded bitstream 251 is generated by applying MPEG based encryption and/or compression operations to audio and/or video data, to enable, for example, secure and/or efficient transmission of media streams. Once the MPEG bitstream 251 is received, it is decoded by the receiving devices to extract and playback contained audio and/or video data. The MPEG encoded bitstream 251 comprises a plurality of logical groupings 253, which in turn comprises a plurality of various types of frames. Exemplary frame types comprise I-frames, P-frames and B-frames. Each frame is comprised of compressed and/or encoded audio and/or video data. I-frames comprise the least degree of compression, and they provide video and/or audio information independent from other frames. P-frames comprise added degree of compression by depending on I-frames during decompression and decoding. B-frames depend on both previous and forward frames for data reference to get the highest amount of data compression.

I-frames are encoded as a single image, and reference no other previous or following frames. Therefore, I-frames are encoded independent of other frames, and consequently, when I-frames are decoded, information comprised within the I-frame may be read and utilized without need for or dependence on data in other frames. P-frames are encoded relative to a reference frame. The reference frame is either an I-frame or a previous P-frame. Generally, the reference frame is the closest preceding reference frame. The data encoded into P-frame may be independent data that may be used independent of data in other frame when the P-frame is decoded. The data in the P-frame may also be dependent on referenced data encoded into the reference frame. Accordingly, at least some of the data in P-frames may only be used after the reference frame is decoded. In instances where the reference frame is lost or is damaged, the P-frame may not be usable, or some operations may need to be performed to compensate for the loss of the referenced data. B-frame, like P-frames, are encoded relative to other frames. However, with B-frames, there may be more than one reference frame, and the reference frames are previous frames, future frames, or both. The reference frames are generally the closest I-frame and/or P-frames. Encoding for B-frames is generally similar to encoding of P-frames. However, with B-frames, the referenced data may be located in future frames.

In operation, the MPEG bitstream 251 is communicated via a plurality of network packets. The network packets utilized in communicating the MPEG bitstream 251 may comprise, for example, the 802.11 packets 240. A size of the I-frames, P-frames and/or B-frames is generally greater than the size of data payload available via a single 802.11 packet 240. Accordingly, a plurality of network packets is generally required to communicate each frame within the MPEG bitstream 251.

Chart 260 shows conventional network packet processing operations. Network processing operations are performed irrespective of the type and/or characteristics of the data communicated. The MPEG bitstream 251, for example, are processed abstractly, simply as a continuous bitstream, as shown in chart 260. Accordingly, the payload of some of the network packets may comprise data corresponding to more than a single frame. For example, the data corresponding to an I-frame may require slightly less than 70 full network packet payloads. Therefore, the network packet 70 comprises some data corresponding to the I-frame, and data corresponding to the following B-frame. Similarly, network packet 89 comprises data corresponding to a B-frame and a P-frame. Loss and/or damage of network packet comprising data corresponding to a plurality of frames, however, may substantially degrade the reliability and/or quality of the data streams that is communicated, because of the frame logical groupings and/or inter-frame dependencies that may be present in the MPEG bitstream 251.

Chart 280 shows network packet processing operations in accordance with an embodiment with the invention. Network packet processing is performed with awareness of characteristics and/or type of the data communicated. Consequently, the generation of the network packets prevents inter-frame data packing within single network packets. The processing of MPEG bitstream 251, for example, is performed in accordance with its frame logical grouping and/or inter-frame dependencies, as shown in chart 280. For example, in instances where the data corresponding to the I-frame requires less than 70 full network packet payloads, the network packet 70 is generated so that it only comprises whatever data is left of the I-frame. The communication of the following B-frame is then initiated using a new network packet.

Figure 3A:
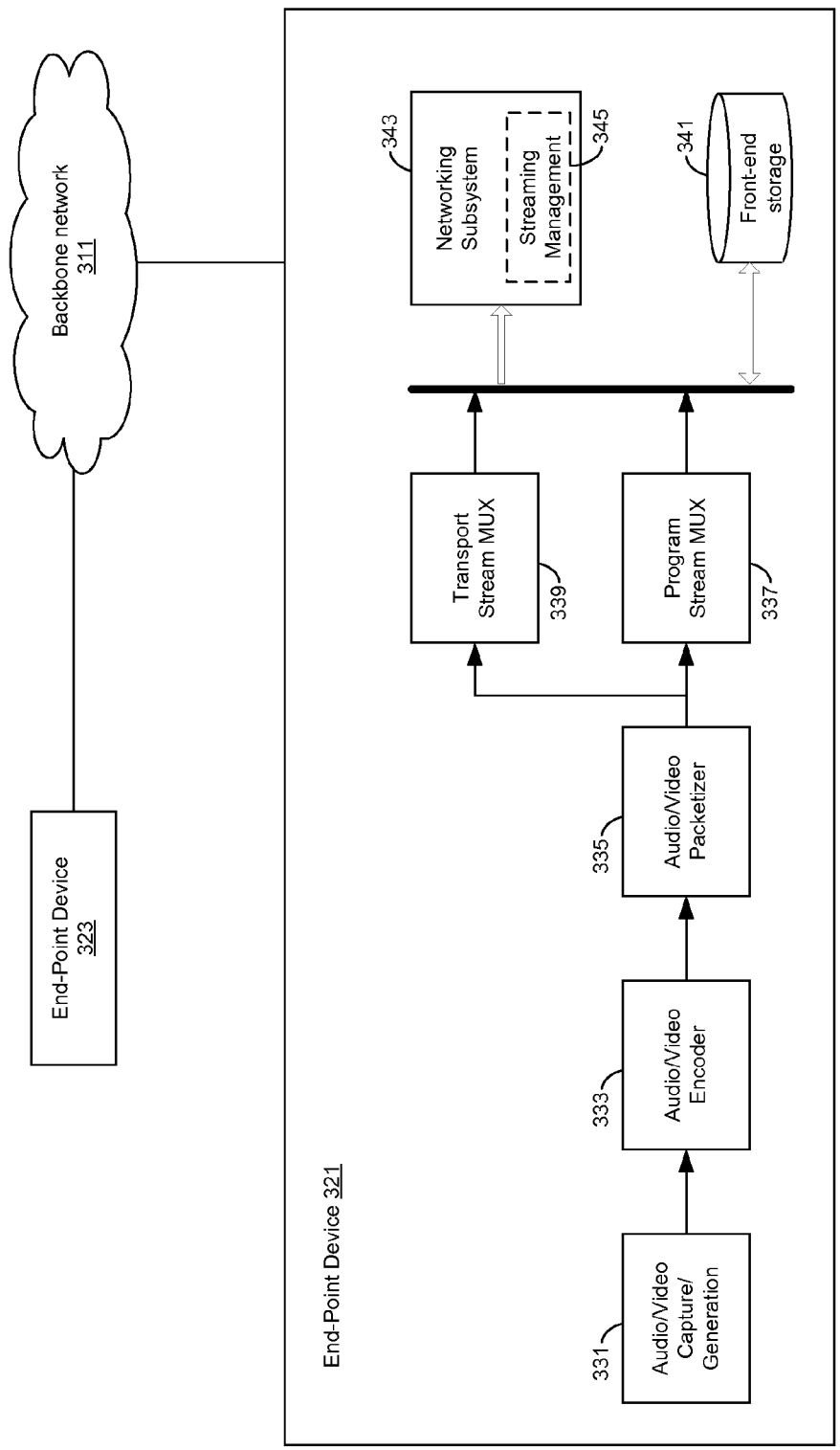
FIG. 3A is a block diagram that illustrates an exemplary system that utilizes post-processing frame tagging to enable network packet awareness during media transport, in accordance with an embodiment of the invention.

FIG. 3A is a block diagram that illustrates an exemplary system that utilizes post-processing frame tagging to enable network packet awareness during media transport, in accordance with an embodiment of the invention. Referring to FIG. 3A, there is shown a backbone network 311, an end-point device 321, an end-point device 323, an audio/video capture/ generation function 331, an audio/video encoder 333, an audio/video packetizer 335, a program stream MUX 337, a transport stream MUX 339, a front-end storage 341, a networking subsystem 343, and streaming management function 345.

The backbone network 311 comprises private and/or public network that is operable to enable communication among a plurality of nodes. The backbone network 182 corresponds to, for example, one or more of the communication networks 111, and is operable to enable communication of data streams, based on one or more networking standards, between the end-point devices 321 and 323.

The end-point device 321 comprises a user end-point device that is operable to generate and/or communicate data streams. The end-point 321 is substantially similar, for example, to any of the end-point devices 121, 123, 125 and/or 127. In exemplary aspect of the invention, the end-point device 321 is operable to generate and/or communicate audio/ video streams, based on, for example, MPEG encoding. The audio/video capture/generation function 331 comprises suitable logic, circuitry and/or code operable to enable capturing and/or generation audio and/or video data. The audio/video capture/generation function 331 may comprise, for example, a digital camera and/or microphone.

The audio/video encoder 333 comprises suitable logic, circuitry and/or code operable to perform encoding operations on input audio and/or video data based on an encoding scheme. For example, the audio/video encoder 333 is operable to perform MPEG based source coding and/or compression on audio and/or video input received from the audio/ video capture/generation function 331. The audio/video encoder 333 outputs encoded, compressed streams corresponding to received audio and/or video data. In an exemplary aspect of the invention, the streams generated by the audio/video encoder 333, comprise a plurality of frames with logical grouping based on inter-frame dependencies. For example, the audio/video encoder 333 is operable to generate a plurality of I-frames, P-frames and B-frames corresponding to received audio and/or video input data.

The audio/video packetizer 335 comprises suitable logic, circuitry and/or code operable to perform packetization operations that enable combining the encoded audio and/or video data into a stream of packets. The packets may comprise, in addition to the encoded media data, a header that comprises mandatory and/or optional subfields and/or flags. The packet headers may provide timestamp, clock and/or rate information that enable subsequent decoding and/or reference processing. The program stream MUX 337 comprises suitable logic, circuitry and/or code operable to generate program streams by multiplexing packetized elementary streams. The program streams are intended for use in relatively error-free environment, for localized storage and/or consumption in the end-point device 321 for example. The transport stream MUX 339 comprises suitable logic, circuitry and/or code operable to generate transport streams by multiplexing packetized elementary streams. The transport streams may be utilized in lossy or noisy transmission and/or storage, for external storage and/or consumption, via the end-point device 323 for example. The transport streams generally comprise a plurality of fixed length packets, for example 188 byte packets with 4 bytes header and 184 byte data.

The front-end storage 341 comprises suitable logic, circuitry and/or code operable to enable storage and/or retrieval of data in the end-point device 321. The front-end storage 341 is operable, for example, to enable storing program streams and/or transport streams generated via the program stream MUX 337 and/or the transport stream MUX 339, respectively, wherein the stored streams may be retrieved for localized playback use and/or for communicating the transport stream to external entitles.

The networking subsystem 343 comprises suitable logic, circuitry and/or code operable to enable performing network interface operations in the end-point device 321, to facilitate, for example, communicating media streams generated and/or processed via the end-point device 321, to external entities, via the backbone network 311 for example. The networking subsystem 343 is operable, for example, to perform network specific channel coding, forward error correction and/or channel specific framing operation to facilitate necessary encapsulation of payload based on applicable communication models. In an exemplary aspect of the invention, the networking subsystem comprises the streaming management function 345 to enable controlling and/or managing networking operations when communicating data streams generated and/or processed via the end-point device 321.

The end-point device 323 comprises suitable logic, circuitry and/or code that is operable to receive data streams communicated via the backbone network 311. The end-point 321 is substantially similar, for example, to any of the end-point devices 121, 123, 125 and/or 127.

In operation, the end-point device 321 is operable to generate and/or communicate audio/video streams. The audio and/or video data are captured and/or generated via the audio/video capture/generation function 331. The audio/video data is then encoded via the audio/video encoder 333. The encoded data may comprise, based on the encoding scheme used, logical groups based on, for example, framing criteria. For example, where MPEG encoding is used, a plurality of I-frames, P-frames and/or B-frame, with some inter-frame dependencies are generated, substantially as described with regards to FIG. 2B. The audio/video packetizer 335 is then operable to perform necessary packetization operations on the encoded audio/video data. For example, in instances where MPEG encoding scheme is utilized to encode captured audio/video data, the audio/video packetizer 335 is operable to generate a stream of MPEG packets that correspond to the captured audio/video data.

The program stream MUX 337 and/or the transport stream MUX 339 are operable to perform any necessary multiplexing operations, for example to enable combining audio and video information into a singular media stream when audio and video information are captured and processed separately. The program stream MUX generates media stream that is suitable for consumption within the end-point device 321 itself. The media steam generated via the program stream MUX 337 may be formatted to enable storage within specific type of storage devices, including for example DVDs. The transport stream MUX 339 is operable to output media streams that may be communicated to other devices, view network connections for example. Communicating of media streams may be performed via the network subsystem 343. The network subsystem 343 is operable to receive the transport stream and encapsulated into network packets that may be communicated via the backbone network 311, to the end-point device 323, for example.

Network interfaces subsystem generally process transport streams with no regards to any specific dependencies within the stream. Consequently, network packets generated may comprise data corresponding to one or more frames in a transport stream comprised of a plurality of inter-dependent frames, substantially as shown in chart 260, as described with regards to FIG. 2B. In an exemplary aspect of the invention, network processing is performed with data awareness to ensure that network packet generation is performed in a manner that maintains and/or improve reliability and use of data. For example, the streaming management function 345 may be operable to determine presence of framing in transport streams that are communicated via the networking subsystem 343. For example, the streaming management function 345 may determine based on header information whether data streams are MPEG encoded, and/or determine boundaries of corresponding I-frames, P-frames and/or B-frames within the data stream. Inter-frame logical grouping and/or dependencies are then considered during generation of network packets to prevents inter-frame data packing within individual network packets, substantially as shown in chart 280, as described with regards to FIG. 2B. Various methods may be utilized to enable the streaming management function 345 to determine framing characteristics of communicated data and/or streams. For example, the streaming management function 345 may be operable to determine framing criteria by looking into appropriate headers to determine the type and characteristics of the data communicated. The streaming management function 345 may also request and/or receive an indication from the dedicated processing subsystems to indicate presence and/or characteristics of framing in transport streams. The audio/video encoder 333, the audio/video packetizer 335 and/or the transport stream MUX 339 are operable to communicate with the streaming management function 345 to indicate use of framing in MPEG encoded streams and/or to provide information to enable determining inter-frame logical grouping information.

Figure 3B:
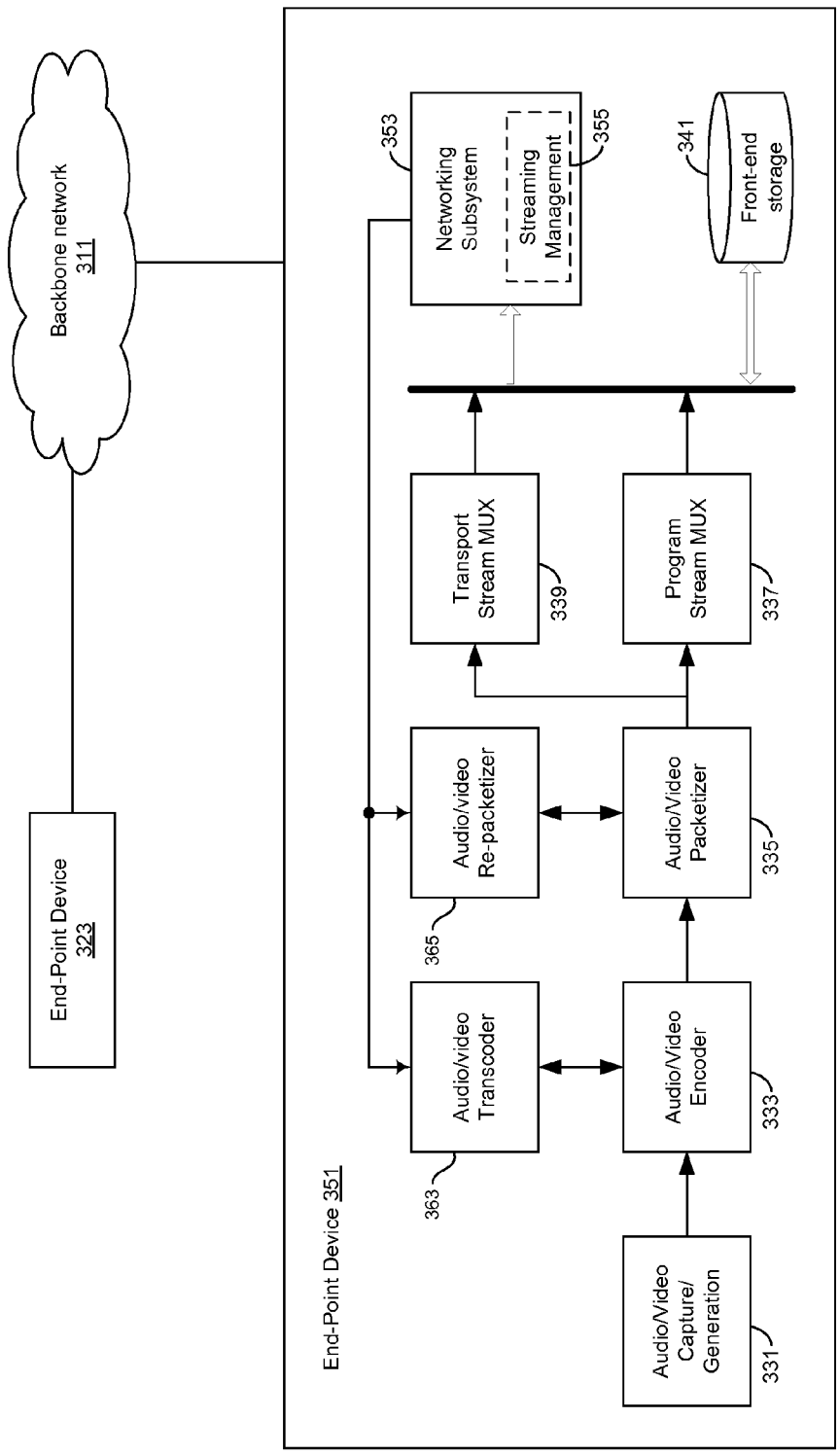
FIG. 3B is a block diagram that illustrates an exemplary system that utilizes framing feedback to enable in-processing network packet awareness during media transport, in accordance with an embodiment of the invention.

FIG. 3B is a block diagram that illustrates an exemplary system that utilizes framing feedback to enable in-processing network packet awareness during media transport, in accordance with an embodiment of the invention. Referring to FIG. 3B, there is shown the backbone network 311, an end-point device 351, the end-point device 323, the audio/video capture/generation function 331, the audio/video encoder 333, the audio/video packetizer 335, the program stream MUX 337, the transport stream MUX 339, the front-end storage 341, a networking subsystem 353, a streaming management function 355, an audio/video transcoder 363, and an audio/video re-packetizer 365.

The end-point device 351 is substantially similar to the end-point device 321, as described with regards to FIG. 3A. The end-point device 351, however, is operable to utilize feedback based streaming management function operations during communication of media streams, utilizing the network subsystem 353, the audio/video transcoder 363, and and/or audio/video re-packetizer 365. The network subsystem 353 is substantially similar to the network subsystem 343, as described with regards to FIG. 3A, and is similarly operable to enable performing network interface operations. The network subsystem 353 is operable, however, to provide feedback to other entities and subsystems within the end-point device 351, regarding networking characteristics. The feedback may specify, for example, the type of network packets available to perform network communications, 802.11 packets for example, and actual size of payload usable within the network packet for communicating data.

The audio/video transcoder 363 comprises suitable logic, circuitry and/or code operable to reprocess data encoded via the audio/video encoder 333. The audio/video transcoder 363 is operable to re-encode the data, for example, based on networking feedback received from the networking subsystem 353. The data is re-encoded, for example, utilizing the same encoding scheme used via the audio/video encoder 333. However, the encoding operations are performed consistent with networking limitations and/or characteristic determined based on received feedback. The audio/video re-packetizer 365 comprises suitable logic, circuitry and/or code operable to reprocess the packetized stream generated via the audio/video packetizer 335. The audio/video re-packetizer 365 is operable to re-encode the data, for example, based on networking feedback received from the networking subsystem 353. The re-packetization operations may be performed consistent with networking limitations and/or characteristic determined based on received feedback.

In operation, the end-point device 351 is operable to generate and/or communicate audio/video streams, substantially similar to the end-point device 321, as described with regards to FIG. 3A. The networking subsystem 353 and/or the streaming management function 355 are operable to determine and/or consider Inter-frame logical grouping and/or dependencies during generation of network packets to prevents inter-frame data packing within individual network packets, substantially as described with regards to FIG. 3A. Additionally, however, the networking subsystem 353 is also operable to provide networking feedback to enable processing of media streams within the end-point device 351 based on network awareness. The network subsystem 353 is operable, for example, to communicate, via the streaming management function 355 for example, networking feedback to audio/video transcoder 363 and/or the audio/video re-packetizer 365. The network feedback may provide network related information including, for example, type of network packets available to perform network communication and/or payload available within network packets. Consequently, the audio/video transcoder 363 and/or the audio/video re-packetizer 365 are operable to reprocessing the media streams generated in the end-point device 351 by re-encoding and/or re-packetizing the stream, to ensure that framing logical groupings are aligned with networking limitations. For example, where the media stream is MPEG encoded, the reprocessing operations ensure that I-frames, P-frame, and B-frames are generated such that the frames, size wise, are multiples of network packets payload sizes. In an exemplary aspect of the invention, the networking feedback may be communicated directly to the audio/video encoder 333, the audio/video packetizer 335 and/or the transport stream MUX 339 to enable direct networking awareness based processing without requiring reprocessing operations.

FIG. 4 is a flow chart that illustrates use of network packet awareness during media transport, in accordance with an embodiment of the invention. Referring to FIG. 4, there is shown a flow chart 400 comprising a plurality of exemplary steps, which may enable network awareness based data encoding in an end-point device.

In step 401 data stream is generated. For example, the audio/video capture/generation function 331 is operable in the end-point device 321 to generate audio/video data. In step 403, applicable framing information, for example logical frame groupings and/or inter-frame dependencies are determined during data encoding operations. For example, where MPEG encoding is utilized, the various groupings of I-frame, P-frame and B-frames may be determined. In step 405, networking parameters are determined. For example, type of network packets available to communicate generated and/or encoded data streams, and available packet payloads for each type of networking interface are ascertained. In step 407, the network packetization of the generated data streams is performed based on considerations of both framing information as determine in step 403 and networking information as determined in step 405. The network packetization is performed in a manner that prevents generation of network packets comprising data corresponding more than one frame and/or crossing logical framing groupings. For example, in instances where MPEG encoding is utilized, network packets are generated such that the payload of each network packets comprises only data corresponding to an I-frame, a P-frame, or a B-frame. This may be achieved may determining framing information during generation of the network packets, substantially as described with regards to the end-point device 321 in FIG. 3A. Alternatively, networking feedback may be provided to enable network awareness based processing, substantially as described with regards to the end-point device 351 in FIG. 3B.

Various embodiments of the invention may comprise a method and system for network packet aware data encoding. The communication devices 121, 123, 125, and/or 127 are operable to manage communication of data streams to improve reliability and robustness of the communication where data communicated via the data streams is encoded utilizing encoding scheme that generates plurality of frames with logical grouping and/or inter-frame dependencies. Exemplary encoding schemes comprise MPEG encoding, wherein generated data streams comprise I-frames, P-frames and/or B-frames, which comprise specific frame groupings 253 wherein P-frame and/or B-frame depend from I-frames within each frame logical grouping. The communication devices 121, 123, 125, and/or 127 are operable to determine network parameters, comprising network packet payload limitations, which are applicable during communication of the data streams via one or more network interfaces utilized by the communication devices 121, 123, 125, and/or 127. The communication devices 121, 123, 125, and/or 127 are operable to rearrange at least a portion of the encoded data based on the network parameters; and communicate the encoded data, utilizing the data streams. Network packets that are utilized to perform data communication, for example the Ethernet packet 230 and/or the 802.11 packet 240, are generated such that the packet payloads 231 and/or 241 comprise only data corresponding to a single frame and/or logical grouping within the encoded data stream. The networking subsystems 343 and/or 353 are utilized in the communication devices 321 and/or 351 to perform data communication via network interfaces, and are enabled manage data streaming communication by examining, for example, appropriate headers to determine type of data communicated and/or framing parameters. Feedback from the networking subsystem 353 in the communication device 351 is provided during processing of the data streams to enable use of network payload parameters during encoding operations. The feedback is utilized, for example, by the audio/video encoder 333, the audio/video packetizer 335, the transport stream MUX 339, the audio/video transcoder 363, and/or the audio/video re-packetizer 365, which are operable to perform encoding related operations. The feedback may be provided dynamically during data communication operations. Feedback is utilized, for example, to adjust encoding parameters and/or streaming packetization to ensure that framing logical groupings in the data stream are aligned with networking limitations, such that, for example, frame sizes are ensured to be multiples of size of payloads 231 and/or 241.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for network packet aware data encoding.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A communication device comprising:
    a networking subsystem configured to communicate media streams from the communication device, the media streams comprising frames of data;
    a streaming management module configured to determine presence in the media streams of interdependent frames of data and produce an indication of the presence of interdependent frames;
    a data processing module in data communication with the networking subsystem and the streaming management module and configured to receive the indication of the presence of interdependent frames and data streams, the data processing module further configured to generate network packets using information about inter-frame dependencies to prevent inter-frame data packing within individual network packets, the data processing module further configured to communicate the network packets to the networking subsystem for communication from the communication device.

2. The communication device of claim 1 wherein the streaming management module is configured to determine presence of interdependent frames from header information of the frames of data.

3. The communication device of claim 2 wherein the streaming management module is configured to identify whether the frames are MPEG frames from the header information of the frames of data and to determined boundaries of corresponding MPEG I-frames, P-frames and B-frames that may be present in the frames of data.

4. The communication device of claim 2 wherein the streaming management module is configured to receive from the data processing module information about inter-frame logical grouping in the media streams and to determine the presence of interdependent frames using the received information.

5. The communication device of claim 1 wherein the data processing module comprises:
    a packetizer configured to receive encoded data and generate the network packets.

6. The communication device of claim 5 wherein the packetizer is configured to receive the information about inter-frame dependencies when generating the network packets to prevent inter-frame data packing within individual network packets.

7. The communication device of claim 5 wherein the packetizer is configured to use information about inter-frame logical grouping to prevent inter-frame data packing within individual network packets.

8. The communication device of claim 7 wherein the data processing module further comprises:
    an encoder in data communication with the packetizer and configured to encode received input data and provide the encoded data to the packetizer.

9. The communication device of claim 8 wherein the encoder is configured to perform MPEG based source coding on the received input data and to produce a plurality of MPEG I-frames, P-frames and B-frames having inter-frame dependencies in the encoded data.

10. The communication device of claim 1 further comprising:
- a program stream multiplexer in data communication with the data processing module and configured to multiplex packetized elementary streams received from the data processing module and to generate program streams for communication by the networking subsystem in a relatively error-free environment; and
- a transport stream multiplexer in data communication with the data processioning module and configured to multiplex packetized elementary streams received from the data processing module and to generate program streams for communication by the networking subsystem in a relatively noisy or lossy environment.

11. A communication device comprising:
- a networking subsystem configured to communicate media streams from the communication device, the media streams comprising frames of data;
- a streaming management module configured to determine presence in the media streams of interdependent frames of data and produce an indication of the presence of interdependent frames;
- a data encoder configured to encode received input data and produce encoded data;
- a transcoder in data communication with the networking subsystem and the data encoder and configured to receive the encoded data and re-encoded the encoded data using networking feedback received from the networking subsystem and produce re-encoded data; and
- a data packetizer coupled to the data encoder and the transcoder and configured to combine the encoded data from the data encoder or the re-encoded data from the transcoder into a stream of network packets, the data packetizer further configured to receive the information about inter-frame dependencies and to generate the network packets using the information about inter-frame inter-frame dependencies to prevent inter-frame data packing within individual network packets.

12. The communication device of claim 11 further comprising:
- a data re-packetizer coupled to the data packetizer and in data communication with the networking subsystem, the data re-packetizer configured to re-packetize combine the encoded data from the data encoder or the re-encoded data from the transcoder into a stream of network packets using networking feedback received from the networking subsystem.

13. The communication device of claim 12 wherein the networking subsystem is configured to provide the networking feedback to the transcoder or to the data re-packetizer to enable processing of the media streams using awareness of a network environment to which the media streams are communicated.

14. The communication device of claim 13 wherein the networking subsystem is configured to provide information about available types of network packets as the networking feedback.

15. The communication device of claim 13 wherein the networking subsystem is configured to provide information about available payload within network packets as the networking feedback.

16. The communication device of claim 13 wherein the transcoder is configured to re-encode the media streams to ensure that framing logical groupings are aligned with networking limitations of the network environment to which the media streams are communicated.

17. The communication device of claim 13 wherein the data re-packetizer is configured to re-packetize the media streams to ensure that framing logical groupings are aligned with networking limitations of the network environment to which the media streams are communicated.

18. A method comprising:
in a communication device,
- receiving data streams from a data source;
- processing the received data streams as network packets and a plurality of data frames including MPEG based I-frames, P-frames or B-frames;
- packetizing the data into a plurality of network packets to prevent generation of network packets which include data frames crossing a logical frame grouping; and
- transmitting said network packets via one or more interfaces of the communication device.

19. The method of claim 18 further comprising:
arranging data in the data streams to prevent generation of network packets which include data corresponding to more than one data frame of said plurality of data frames.

20. The method of claim 19 further comprising:
receiving data for transmission from the communication device;
encoding the received data according to a predetermined data coding protocol prior to processing the data streams;
receiving network feedback;
using the network feedback, arranging the received data in data streams to encode or re-encode the received data to ensure that framing logical groupings are aligned with networking limitations as evidenced by the network feedback.

* * * * *